United States Patent
Shitara et al.

(10) Patent No.: US 8,031,421 B2
(45) Date of Patent: Oct. 4, 2011

(54) METHOD FOR MEASURING OPTIMUM SEEKING TIME AND INSPECTION APPARATUS USING THE SAME

(75) Inventors: Kenichi Shitara, Kamisato (JP); Sumihiro Maeda, Kamisato (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/788,481

(22) Filed: May 27, 2010

(65) Prior Publication Data

US 2010/0302665 A1    Dec. 2, 2010

(30) Foreign Application Priority Data

May 28, 2009    (JP) .................................. 2009-128633

(51) Int. Cl.
*G11B 27/36* (2006.01)
(52) U.S. Cl. .......................................................... 360/31
(58) Field of Classification Search .................... 360/31, 360/75, 69, 70, 77.02, 78.01, 78.04, 78.06, 360/78.08; 341/110, 155
See application file for complete search history.

(56) References Cited

U.S. PATENT DOCUMENTS

| | | | | | |
|---|---|---|---|---|---|
| 5,838,274 | A | * | 11/1998 | Johnson et al. | 341/155 |
| 5,859,742 | A | * | 1/1999 | Takaishi | 360/78.01 |
| 5,864,311 | A | * | 1/1999 | Johnson et al. | 341/155 |
| 5,872,531 | A | * | 2/1999 | Johnson et al. | 341/110 |
| 6,487,146 | B1 | * | 11/2002 | Verboom | 369/44.25 |
| 6,980,491 | B2 | * | 12/2005 | Shiratori et al. | 369/13.42 |
| 7,457,069 | B2 | * | 11/2008 | Yoshioka et al. | 360/75 |
| 7,457,076 | B2 | | 11/2008 | Semba et al. | |

FOREIGN PATENT DOCUMENTS

JP    2006-202368    8/2006

* cited by examiner

*Primary Examiner* — Fred Tzeng
(74) *Attorney, Agent, or Firm* — Brundidge & Stanger, P.C.

(57) ABSTRACT

The present invention provides a method for measuring an optimum seeking time and an inspection apparatus using this method capable of measuring and setting an optimum seeking time for inspection of a magnetic disk or magnetic head. The method samples average level differences of sector-wise read signals in positive and negative domains for one round of track and detects a minimum value H and a minimum value L among these differences. The method recalculates the seeking time while changing the settling time. After writing and reading test data, calculates a deviation DEV of average levels DEV=(H−L)/(H+L). The method is adapted to obtain a minimum one of the values of settling time having measured when the deviation DEV of average levels is equal to or less than a predetermined value as an optimum settling time or an optimum seeking time.

10 Claims, 4 Drawing Sheets

(CALCULATION FORMULA)

$$DEV = \frac{HF_{MAX} - HF_{MIN}}{HF_{MAX} + HF_{MIN}} \times 100 \ (\%)$$

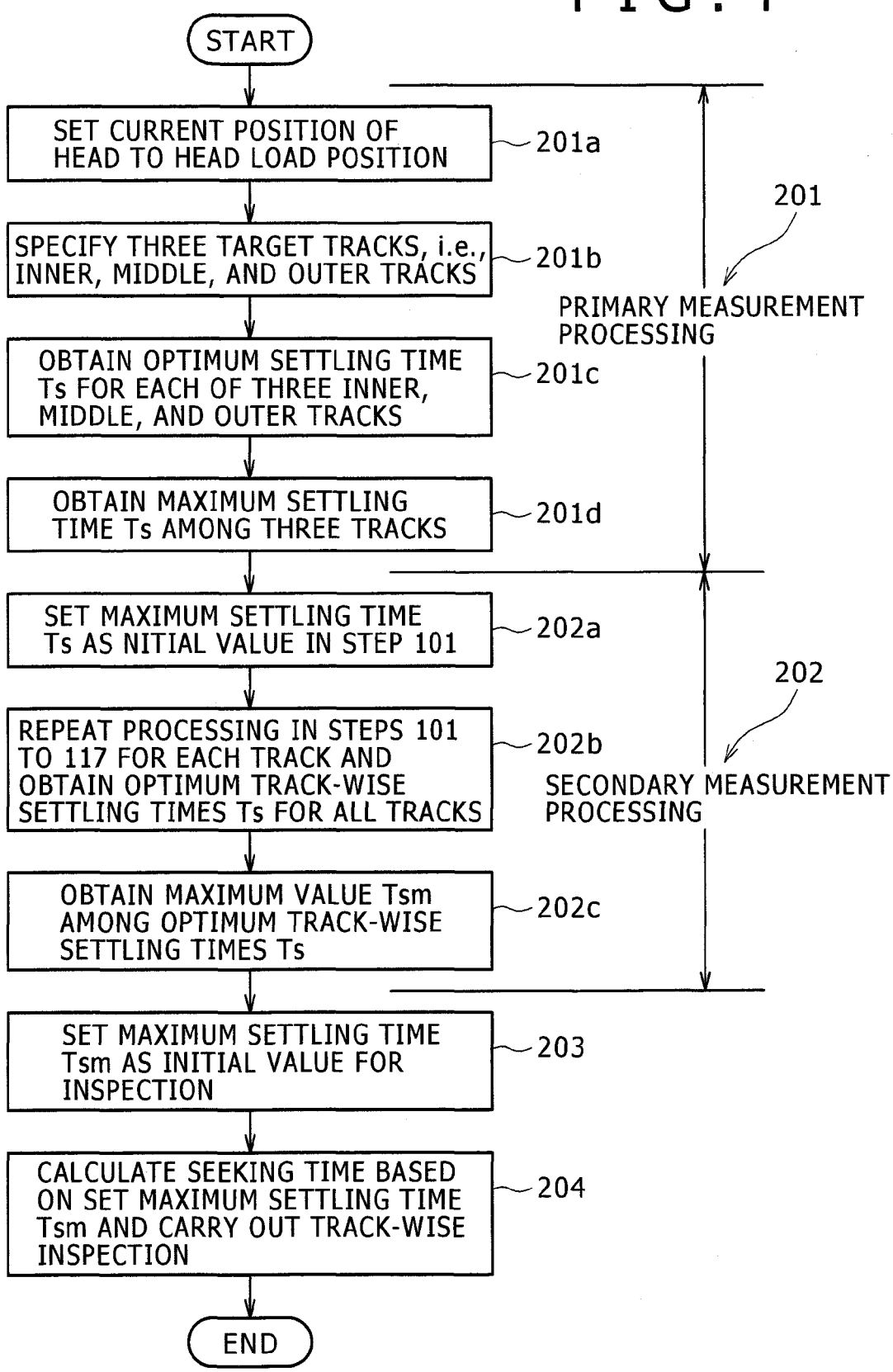

METHOD FOR MEASURING OPTIMUM SEEKING TIME AND INSPECTION APPARATUS USING THE SAME

BACKGROUND OF THE INVENTION

This invention relates to a method for measuring an optimum seeking time, taking time for settling a magnetic head into account, and an inspection apparatus using this measuring method. More particularly, in inspecting a magnetic disk or magnetic head, with respect to seeking time required when positioning the magnetic head at a target track and reading/writing data from/to the track, the invention relates to a method for measuring an optimum seeking time, taking time for settling a magnetic head into account, wherein the method can improve inspection throughput by measuring an optimum value of seeking time, taking time for settling a magnetic head into account, and setting the measured seeking time as a seeking time in the inspection of the magnetic disk or magnetic head.

In the inspection of a magnetic disk or magnetic head, when the magnetic head seeks a target track from its predetermined load position or the current track position, unless the vibration of an actuator (such as a voice coil motor) excited by a seek operation must attenuate, the magnetic head also vibrates without being stabilized in position. Therefore, a seeking time including a latency (settling time) until attenuation of the vibration of the magnetic head (actuator) is set and seeking to a target track is performed.

In particular, for a seek operation of a head under open control, the magnetic head is accelerated to a maximum speed from the load position or the current track position and, then, attenuated and positioned at a target track. In this case, the seeking time of the magnetic disk is typically defined as the sum of the positioning time until the head has been stopped, positioned at the target track, and the latency (settling time) until the vibration of the actuator has attenuated after the stop and positioning of the head.

The time until the head has been stopped and positioned in a seek operation varies with a position at which the seek is to start and a distance to the target track. A mechanical subsystem such as an arm for seeking of the head generally has a high frequency vibration proper to the mechanical subsystem. The settling time varies with the mechanical relation between the magnetic head (magnetic head assembly) and the mechanical components such as a head carriage and a spindle on which the magnetic head is placed. Moreover, the settling time also depends on aging of a driving part for the head carriage and of the mechanical subsystem.

As for the settling time, a driving technique using feed forward control that suppresses resonance of the mechanical subsystem and shortens a seeking time has been developed and already known publicly, for example, in Japanese Laid-Open Patent Application No. 2006-202368.

Conventionally, the settling time in a seek operation under open control is set at about, e.g., 50 msec, a maximum time required for ensuring the settling plus a margin, based on which, a seeking time is determined. According to this, inspection of a magnetic disk or magnetic head is performed. However, when the settling time is set at about 50 msec, the inspection is inefficient because of a long seeking time.

If a settling time shorter than 50 msec is selected, however, there is a problem that the selected settling time may be exceeded depending on conditions of the mechanical components such as the head carriage and the spindle on which the magnetic head was placed, aging of the driving part for the head carriage and of the mechanical subsystem, and replacement of the driving part for the head carriage, etc.

SUMMARY OF THE INVENTION

Proper measurement results cannot be obtained from inspection of magnetic disks or magnetic heads inspected using a seeking time in which the settling time is exceeded. If such disks or heads are installed in magnetic disk equipment, there is fear that the reliability of the equipment is deteriorated. At present, however, there is no way of knowing a point of time when an actual settling time of a magnetic head has exceeded the selected settling time.

A settling time that has been set including an additional margin poses a problem that it makes a seeking time longer, thereby, inspection throughput decreases. Thus, there is a need for setting an optimum seeking time in inspection of a magnetic disk or magnetic head.

This invention is intended to solve the above problems of the prior art and its object is to provide a method for measuring an optimum seeking time, taking time for settling a magnetic head into account, the method being capable of measuring and setting an optimum seeking time in inspection of a magnetic disk or magnetic head and improving inspection throughput, and an inspection apparatus using this measuring method.

In order to attain such object, the prevent invention provides a method for measuring an optimum seeking time and an inspection apparatus using this method, the method including calculating a seeking time to be taken for a seek from a given track or head load position to a target track, actuating a magnetic head to seek the target track in compliance with the seeking time, writing test data to the target track after the seeking time, reading the written test data from the target track, detecting sector-wise average levels of the test data read levels in positive and negative domains respectively, and sampling a waveform of the average levels for one round of track.

The method further includes detecting a maximum value H and a minimum value L among peak-to-peak amplitudes in the sampled waveform for one round of track, further calculating a deviation DEV of the average levels by an equation, $DEV=(H-L)/(H+L)$, $DEV=(H-L)/H$, or $DEV=(H-L)/L$, where DEV is a deviation of the average levels, and judging whether the deviation DEV of the average levels is equal to or less than a predetermined value or exceeds the predetermined value.

The above predetermined value corresponds to the deviation DEV of the average levels calculated by the selected equation, when a seeking time is set including the settling time that is equal to or more than a maximum time of settling ensuring that the magnetic head is settled during the seek to the target track. The method further includes calculating the seeking time while changing the settling time and, after writing and reading test data, obtaining, as an optimum seeking time, a minimum value of seeking time equal to or less than the predetermined value obtained by the judgment or obtaining, as an optimum settling time, a value of settling time when the minimum value of seeking time is obtained.

When the magnetic head (actuator) positioned on the target track is vibrating, the level of write signals for writing test data to the track decreases due to a positional error of the head from the track caused by the vibration. Accordingly, the level of read signals decrease. Then, the positional error of the magnetic head is captured through a waveform of the read signals and can be detected as a vibration component of the magnetic head (actuator). However, the disk rotating on the spindle is eccentric and the positional relation between the magnetic head and a track varies according to the write/read situation case by case. Hence, the positional relation between the magnetic head (actuator) and the vibration during settling is hard to clarify only by acquiring the read signals.

The vibration of the magnetic head during settling is a mechanical vibration attributed to the structure of a mechanical subsystem such as a head carriage and mainly includes high frequency vibration caused by the drive of the actuation. Here, focusing attention on the high frequency vibration, the condition of settling of the magnetic head is detected as an electric signal by sampling average levels of sector-wise read levels. Thereby, a waveform of read signals corresponding to the vibration of the magnetic head can be obtained.

From this waveform of read signals, the method of the invention detects a maximum value H and a minimum value L among peak-to-peak amplitudes in the waveform of sector-wise average levels in positive and negative domains for one round of track and calculating a deviation DEV of the average levels in an equation of the deviation of the average levels, DEV=(H−L)/(H+L), DEV=(H−L)/H, or DEV=(H−L)/L. In each of these equations, the deviation DEV of the average levels represents the positional error from the track due to the vibration of the magnetic head in one round of track.

The deviation DEV of the average levels is calculated by the above equation when a seeking time is set including the settling time that is equal to or more than a maximum time of settling ensuring that the magnetic head is settled during the seek to the target track. The thus calculated DEV value corresponds to the DEV value when the vibration of the magnetic head has attenuated surely. Meanwhile, an optimum settling time is a minimum value during time until the vibration of the magnetic head attenuates in terms of improvement of inspection throughput.

Thus, the value of deviation DEV of the average levels when the vibration of the magnetic head has attenuated surely is taken as a criterion. While changing the seeking time until exceeding this criterion, the method here detects a minimum value of seeking time as an optimum seeking time.

Specifically, the method actuates the magnetic disk to seek a track while changing the settling time and detects a minimum one of the values of settling time having measured when the deviation DEV of the average levels is equal to or less than a predetermined value, for example, 0.03 obtained by DEV=(H−L)/(H+L), thereby obtaining an optimum settling time or an optimum seeking time.

The predetermined value=0.03 is assigned, because the deviation DEV of average levels falls between 0.02 and 0.03, when the maximum settling time, i.e., 50 ms has been set to ensure settling even when any track on the magnetic disk is selected as the target track. This indicates that a limit value of the deviation DEV of the average levels is 0.03. Although the predetermined value=0.02 may be assigned, the larger predetermined value of 0.03 is adopted in an embodiment which will be described later in terms of throughput improvement, as settling may be regarded as done virtually even somewhat before the vibration of the magnetic head attenuates completely.

Thus, this invention detects a maximum value H and a minimum value L among peak-to-peak amplitudes in the waveform of sector-wise average levels in positive and negative domains for one round of track from the waveform of the read signals. The invention then recalculates the seeking time while changing the settling time. After writing and reading test data, the invention calculates a deviation DEV of the average levels by an equation of the deviation of the average levels, DEV=(H−L)/(H+L), DEV=(H−L)/H, or DEV=(H−L)/L. Then, the invention obtains a minimum one of the values of settling time having measured when the deviation DEV of the average levels is equal to or less than the predetermined value as an optimum settling time or an optimum seeking time.

In consequence, it becomes possible to measure and set an optimum seeking time for inspection of a magnetic disk or magnetic head and inspection throughput can be improved.

These features and advantages of the invention will be apparent from the following more particular description of a preferred embodiment of the invention, as illustrated in the accompanying drawings.

BRIEF DESCRIPTION OF THE DRAWINGS

FIG. 4 is a flowchart illustrative of measurement processing with regard to settling time that is initially set in order to obtain an optimum settling time in shorter time.

DESCRIPTION OF THE PREFERRED EMBODIMENTS

Figure 1:
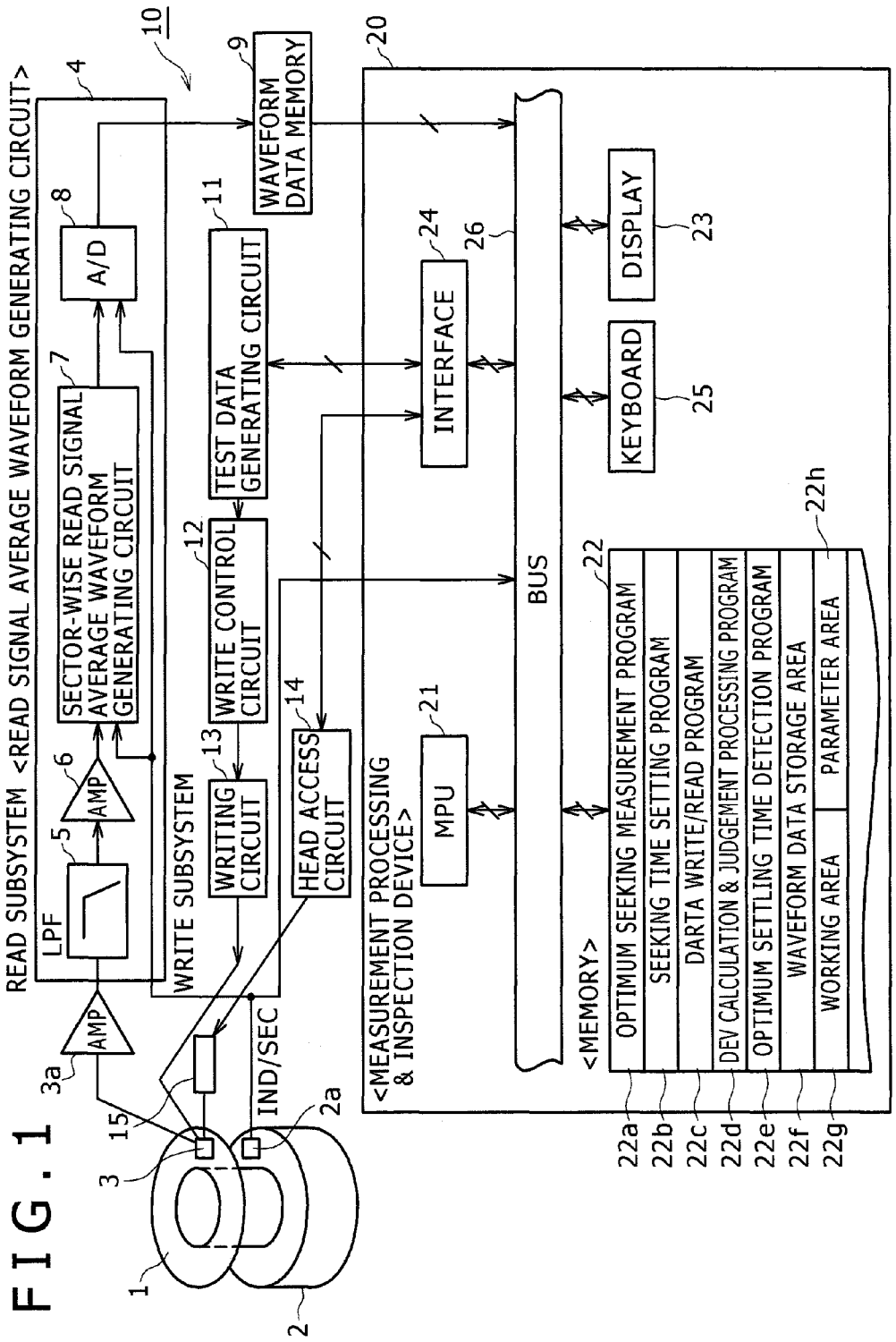
FIG. 1 is a block diagram of an embodiment of an inspection apparatus having a function of measuring an optimum seeking time, which applies a method for measuring an optimum seeking time according to the present invention.

In FIG. 1, reference numeral 10 denotes an inspection apparatus having a function of measuring an optimum seeking time. The inspection apparatus includes a magnetic disk (hereinafter, a disk) 1, a spindle 2, a magnetic head (hereinafter, a head) 3, a read signal average waveform generating circuit 4, and a measurement processing and inspection device 20.

The disk 1 is placed on the spindle 2 and rotates. The spindle 2 is equipped with a rotary encoder 2a that generates an index signal IND (or sector signal SEC).

The head 3 is mounted on a head carriage 15 to face the disk 1 and loaded to a position on the disk 1.

When a target track on the disk 1 is specified, the head 3 seeks the target track from a predetermined track or a head load position and then is stopped and positioned on the target track in a seeking time that has been set for the seek. After a certain settling time, the head 3 writes test data with a given frequency to the target track and reads the test data from the target track. The above seeking time includes the certain settling time.

A read signal that has been read by the head 3 is input via a read amplifier (AMP) 3a to a low pass filter (LPF) 5 in a read signal average waveform generating circuit 4. The LPF 5 is a filter that allows only a signal falling within a certain band for measurement to pass through, but steeply cuts off components above the band to eliminate high frequency noise.

The LPF 5 yields an output signal at frequency fo with respect to the assumed frequency 2 fo of write test data, the frequency ranging from about 1 MHz to 800 MHz or higher.

Given that an 800 MHz read signal is yielded here, then the 800 MHz read signal is amplified by an amplifier (AMP) 6 and input to a sector-wise read signal average waveform generating circuit 7 that generates average levels of sector-wise read signals in positive and negative domains.

The sector-wise read signal average waveform generating circuit 7 can be implemented by operating a well-known TAA circuit (generating average levels for one round of track) by using a sector signal instead of an index signal IND.

The sector-wise read signal average waveform generating circuit 7 and an A/D converter circuit (A/D) 8 receive an index signal IND (or sector signal SEC) from the rotary encoder 2*a*. Assuming that there are 1024 sectors in one round, the sector-wise read signal average waveform generating circuit 7 calculates average levels of respective read signals corresponding to the 1024 sectors and transmits them to the A/D converter circuit (A/D) 8. The A/D 8 converts the sector-wise average levels into digital data and transmits the digital data to a waveform data memory 9. Circuits in series from the LPF 5 to the A/D 8 are components of the read signal average waveform generating circuit 4.

As a result, the thus calculated average levels of the sector-wise read signals for one round of track in positive and negative domains are stored as data into the waveform data memory 9.

Data thus stored in the waveform data memory 9 is then read by an MPU 21 via a bus 26 in the measurement processing and inspection device 20.

The above index signal IND (or sector signal SEC) from the rotary encoder 2*a* is also input to the measurement processing and inspection device 20.

Writing of test data to the disk 1 is performed via a test data generating circuit 11, a write control circuit 12, and a writing circuit 13. The test data generating circuit 11 generates test data in response to a control signal from the measurement processing and inspection device 20. The write control circuit 12 causes the writing circuit 13 to write test data at specified timing.

Reference numeral 14 denotes a head access circuit that drives the head carriage 15 in response to a control signal from the measurement processing and inspection device 20, thus positioning the head 3 to a target track. A driving circuit that drives the disk 1 to rotate is omitted from FIG. 1.

The measurement processing and inspection device 20 includes a MPU 21, a memory 22, a display 23, an interface 24, a keyboard 25, etc. These components and the waveform data memory 9 are interconnected via the bus 26.

Figure 2:
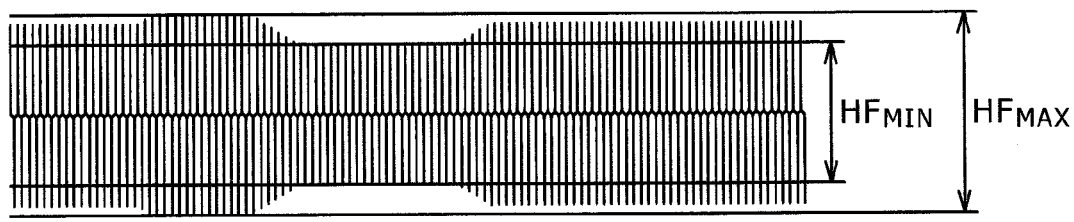
FIG. 2 is a graph illustrative of a detected waveform of sector-wise average levels for one round of track generated by a read signal average waveform generating circuit.

FIG. 2 is a graph illustrative of a waveform of sector-wise average levels for one round of track generated by the read signal average waveform generating circuit 4.

The sector-wise average levels can be displayed as an analog waveform with positive and negative polarity as shown in FIG. 2, wherein the waveform including the average levels (amplitudes) corresponding to 1024 sectors for one round in positive and negative domains, respectively, is produced.

In this waveform, a region where a decrease in waveform amplitude is seen represents the occurrence of an average positional error of the head 3 from the track for each sector due to vibration of the magnetic head (actuator).

Then, among the peak-to-peak amplitudes in the waveform of sector-wise average levels of read signals for one round of track, a maximum value HFMAX (corresponding to a maximum value H in this invention) and a minimum value HFMIN (corresponding to a minimum value L in this invention) are calculated. A deviation DEV of the average levels=(HFMAX−HFMIN)/(HFMAX+HFMIN) (or DEV (%)={(HFMAX−HFMIN)/(HFMAX+HFMIN)}.times.100) is calculated. When this deviation has become 0.03 or less, it is judged that the vibration attenuates and settling has been done.

Waveform data for the average levels of the read signals obtained during one time of measurement, which can be retrieved from the waveform data memory 9, may be read by the MPU 21 via the bus 26 and transferred to the memory 22 via the bus 26 or may be directly transferred to the memory 22 from the waveform data memory 9. Then, this data is stored into a waveform storage area 22*f* in the memory 22. Thereby, next measurement data for one round of another track can be overwritten into the waveform data memory 9.

The following are stored in the memory 22: an optimum seeking time measurement program 22*a*, a seeking time setting program 22*b*, a data write/read program 22*c* for a seek to a target track and writing and reading data to/from the track, a DEV calculation and judgment processing program 22*d* for calculating a deviation DEV of average levels and judging the DEV value, an optimum settling time detection program 22*e*, etc. In addition, inter alia, a waveform data storage area 22*f*, a working area 22*g*, and a parameter area 22*h* for storing control data for measurement are provided.

When measurement processing for an optimum seeking time measurement is activated through user input using a predefined function key, the MPU 21 executes the optimum seeking time measurement program 22*a*. When the optimum seeking time measurement program 22*a* is executed by the MPU 21, the MPU 21 waits for user input of a target track. When a target track is fixed, the MPU 21 AC erases the target track and calls and executes the seeking time setting program 22*b*, the data write/read program 22*c*, the DEV calculation and judgment processing program 22*d*, the optimum settling time detection program 22*e*, etc. sequentially.

When the seeking time setting program 22*b* is executed by the MPU 21 calculates a distance to the target track from a settling time Ts stored in the parameter area 22*i* and the current position of the head 3 which may be a track position or head load position. The MPU 21 then calculates a seeking time to be taken for seeking the target track from time to be taken for stopping and positioning the head, which is calculated from the above distance, and the settling time Ts. Then, the MPU 21 calls the data write/read program 22*c*.

The above settling time TS is set at 50 msec as an initial value when initiating the measurement.

When the data write/read program 22*c* is executed by the MPU 21, it causes the head 3 to seek the specified target track in compliance with the calculated seeking time, write test data, and read the test data. Thereby, average waveform data including positive and negative average levels of sector-wise read signals for one round of track is sampled and stored into the waveform data memory 9.

Then, the MPU 21 calls and executes the DEV calculation and judgment processing program 22*d* and transfers the sampled data from the waveform data memory 9 to the waveform data storage area 22*f* and stores the waveform data into this area. When the MPU 21 executes the DEV calculation and judgment processing program 22*d*, it further calculates a deviation DEV of average levels and judges whether the deviation DEV of average levels is equal to or less than a predetermine value. If it is judged that DEV is equal to or less than the predetermine value, the MPU 21 returns to the optimum seeking time measurement program 22*a*. The MPU 21 then calls the seeking time setting program 22*b* and updates the settling time Ts to a shorter time and thus updates the seeking time so that the seeking time will become shorter. The MPU 21 then calls and executes the data write/read program 22*c*. Following that, the MPU 21 calls and executes the DEV calculation and judgment processing program 22*d*. The MPU 21 repeats the above processing until the deviation DEV of average levels exceeds the predetermined value.

Once the deviation DEV of average levels has exceeded the predetermined value, the MPU 21 calls the optimum settling time detection program 22*e*.

When the optimum settling time detection program 22e is executed by the MPU 21, the MPU 21 detects, as an optimum settling time, a minimum value among the values of settling time obtained while the deviation DEV of average levels was not more than the predetermined value, and calculates an optimum seeking time. Thereby, an optimum seeking time is measured.

In the following, the processing for measuring an optimum seeking time is described concretely, according to a flowchart of seeking time measurement processing of FIG. 3.

First, the MPU performs initial setting by storing an initial value of settling time Ts=50 msec in the parameter area 22i (step 101) and waists for input of a target track (step 102). Upon the input of a target track, the MPU executes an AC erasing to the specified target track (step 103). Then, the MPU 21 calls and executes the seeking time setting program 22b by which a seeking time including the settling time is calculated and stored into a predetermined subarea of the parameter area 22i, thereby setting the seeking time (step 104).

Initially, the seeking time setting program 22b assumes the settling time as the initial value of 50 msec, calculates positioning time T from the number of tracks (distance) from the current position of the head 3 to the target track, and calculates the seeking time S=T+50 msec which is then returned to the optimum seeking time measurement program 22a. As the positioning time T is stored, such calculation can be skipped in subsequent processing of step 104.

The settling time Ts=50 msec is the maximum settling time until the vibration of the magnetic head attenuates completely after the stop and positioning of the head for a seek from any track to any track on the disk, but it slightly varies with the diameter of the disk. Of course, the above value of settling time is larger than any settling time during a seeking time in which the head 3 is positioned on the specified target track and its settling is done.

Specifically, with regard to a seek from the head load position to an outermost track on the magnetic disk, a seek from the head load position to an innermost track on the magnetic disk, a seek from the outermost track to the innermost track, and a seek from the innermost track to the outermost track, the above value of settling time is given to be equal to or more than a maximum value of settling time in any of the above seeks in which settling takes longest. This is the initial value of settling time of 50 msec.

The current position may be either a track position in which the head 3 is now located or the head load position (home position).

Next, the MPU 21 calls and executes the data write/read program 22c by which the head 3 is actuated to seek the target track from the current position in compliance with the seeking time S stored in the parameter area 22i (step 105). The MPU then waits until the head has been settled; that is, it determines whether the settling has been done, i.e., it determines whether the seeking time is over by determining whether the seeking time S has elapsed (step 106).

The MPU 21 then writes test data for one round of track to the target track in sync with an index signal IND (step 107). Following that, the MPU reads the written test data and stores data for sector-wise average levels of read signals in positive and negative domains for one round of track into the waveform data memory 9 (step 108).

After reading the test data for one round of track, the MPU 21 calls and executes the DEV calculation and judgment processing program 22d, and reads and transfers the data stored in the waveform data memory 9 to the internal memory 22 (waveform data storage area 22f) (step 109). Then, the MPU calculates a maximum value HFMAX (=H) and a minimum value HFMIN (=L) among the peak-to-peak amplitudes in the waveform of the sampled average levels for one round of track (step 110). Following that, the MPU calculates a deviation DEV of the average levels of the read signals by the above-presented equation (step 111). Then, the MPU judges whether the calculated DEV is equal to or less than M (=0.03) (step 112). If so (YES, step 112), the MPU updates the settling time Ts by recalculating it as Ts=Ts−.alpha. (step 113) and stores the updated settling time Ts in the parameter area 22i additionally in order (step 114).

Then, the MPU executes the AC erasing to the target track (step 115), returns the head 3 from the target track to its initial track position at the start of processing (step 116), and returns to the step 104.

In the step 112, if not so (NO), the processing goes to step 117. The MPU 21 calls the optimum settling time detection program 22e and enters the processing of detecting an optimum settling time.

In the foregoing, M should be 0.03 (=3%) and .alpha. should be selected from a range of 1 msec to 3 msec. In this manner, an optimum settling time Ts, which typically falls between 10 msec and 30 msec, can be obtained as a limit value immediately before the deviation DEV of average levels exceeds 0.03.

By the way, the value of M=0.03 is assigned, because the deviation DEV of average levels falls between 0.02 and 0.03 when 50 msec has been set. Thus, the limit value of the deviation DEV of average levels is assumed to be 0.03. Although the predetermined value=0.02 may be assigned, as previously mentioned, the larger predetermined value of 0.03 is adopted here in terms of throughput improvement, as settling may be regarded as done virtually even somewhat before the vibration of the magnetic head attenuates completely.

The value of M=0.03 is an actually measured value from the inspection of disks up to now. The value of M may increase or decrease with a change in the recording density of disks, the mechanical structure of the carriage, the structure of the head, etc.

In the step 112, if not so (NO), the processing goes to step 117. The MPU refers to the second last value of settling time Ts among the values of settling time Ts additionally stored in the parameter area 22i, sets this value as an optimum settling time, and stores it into the parameter area 22i.

The second last value of settling time Ts in this case is a limit value not exceeding 0.03 (=3%) and the minimum settling time Ts.

Based on this optimum settling time, a seeking time is calculated. According to the seeking time, the head 3 is actuated to seek the target track, whereby the disk or magnetic disk is to be inspected.

If there are plural target tracks, an optimum settling time may be measured for each target track and the values of optimum settling time corresponding to the respective target tracks may be stored into the parameter area 22i and used. Alternatively, a maximum value of settling time among the plural target tracks may be selected and used as a common value of settling time for the target tracks to set a seeking time.

When 50 msec, which is a maximum time for ensuring that the vibration of the head 3 is settled (attenuated) plus a margin, has been set as the initial value, the processing in steps 104 to 116 is to be circulated about 5 to 8 times to obtain a limit value of the deviation DEV of average levels. While the judgment in the step 112 is repeated, once the deviation DEV of average levels has exceeded 0.03, this circulated processing terminates.

The processing in steps 103 to 116 takes time, as it involves AC erasing to the target track, test data writing and reading, etc. In most cases, an optimum settling time Ts falls between around 10 msec and 30 msec, though depending on the carriage mechanism and the inspection device. Hence, if the settling time is decremented by 1 msec in the step S113, the judgment in the step 112 will become NO after about 20 times of YES judgment.

Therefore, the initial value set in the step 101 that is closer to an optimum settling time Ts will result in a shorter processing time to be taken before detecting the optimum settling time Ts.

As previously mentioned, with regard to a seek from the head load position to the outermost track on the magnetic disk, a seek from the head load position to the innermost track on the magnetic disk, a seek from the outermost track to the innermost track, and a seek from the innermost track to the outermost track, if time for setting that takes longest in any of the above seeks is measured, time shorter than 50 msec can be set as the initial value. Thereby, it is possible to reduce the number of iterations of the processing in steps 103 to 116 until obtaining an optimum settling time Ts (limit value) immediately before exceeding 0.03.

As previously mentioned, because the positioning time during a seeking time depends on the distance of the start position to the target track, the settling time Ts obviously varies with what track is set as the target track.

Furthermore, if the whole surface of a magnetic disk is actually inspected, the head is moved track by track in order. In this case, if an optimum settling time Ts is detected separately for each adjacent track to be sought with the initial settling time Ts=50 msec, too much time is taken for measurement, considering the current recording density of a disk having tracks over 10,000/inch.

As a way of determining an optimum settling time Ts, a better method includes moving the head track by track in order, obtaining an optimum settling time Ts for each track, and detecting a maximum value among the values of settling time obtained for all tracks. This makes it possible to inspect the whole surface of a magnetic disk or the like, using a single optimum value of settling time Ts that is common for all tracks.

Sparse inspection is also carried out to inspect the whole surface of a disk, instead of inspecting track by track. In a case where sparse inspection of tracks spaced about 5 .mu.m to 20 .mu.m is performed, an optimum settling time may be obtained for each of the tracks spaced about 5 .mu.m to 20 .mu.m accordingly and a maximum value may be set as an optimum settling time Ts for these tracks.

Then, a method for optimally selecting the settling time to be set initially in order to obtain an optimum settling time Ts in shorter time is a processing procedure of FIG. 4.

FIG. 4 is a flowchart illustrative of measurement processing with regard to settling time that is initially set in order to obtain an optimum settling time in shorter time.

First, as primary measurement processing (step 201), the MPU sets the current position of the head 3 to the head load position (step 201a), based on which a seeking time is set in the above step 104 of setting a seeking time including the setting time.

Instead of inputting a target track data via the keyboard, which is input in the step 102, three tracks are specified as targets; i.e., an inner track of the disk 1, a middle track between the inner and outer tracks, and an outer track (step 210b). After repeating iterative processing in the steps 101 to 116 for each track, the MPU obtains an optimum settling time Ts for each of the three tracks in the step 117 (step 201c). After storing these values of Ts into the parameter area 22i, the MPU detects the maximum value of settling time Ts among the settling times of the three tracks and set it as an optimum settling time Ts (step 201d).

Although an optimum settling time Ts for the inner, middle, and outer tracks is obtained in this primary processing, in actual magnetic disk inspection, the following may be performed: for each of spaced tracks, for example, tracks spaced about 10 .mu.m to 20 .mu.m, the MPU obtains an optimum settling time for each tracks and extracts a maximum one among the obtained optimum setting time for each tracks and set it as the optimum settling time Ts.

Next, the processing goes to track-by-track measurement (step S202) in which seeking each track in order is performed as secondary measurement processing. The MPU sets the optimum settling time Ts obtained in the step 201d as an initial setting value in the above step 101 (step 202a). By repeating the processing in the steps 101 to 117 for each track, the MPU stores the track-wise values of settling time Tst for all tracks into the parameter area 22i (step 202b).

Then, the MPU detects a maximum one of these values of settling time Ts as an optimum settling time Tsm (step 202c). The MPU stores the maximum settling time Tsm as an initial value for inspection into the parameter area 22i (step 203). The MPU determines a seeking time for each track from the maximum settling time Tst stored in the parameter area 22i and track-wise positioning time and starts track-wise inspection of the magnetic disk (step 204).

Although, in the described embodiment, it is judged whether the calculated value DEV is equal to or less than M in the step 112, it may be judged whether the calculated value DEV exceeds M. In the latter case, the processing paths of YEA and NO may be interchanged. Further, it may be judged whether the calculated value DEV is equal to or more than M and the processing may include initially setting a seeking time shorter than the settling time with an initial value not more than 20 msec. A minimum value of settling time may be obtained by repeating the processing in the steps 101 to 116.

Figure 3:
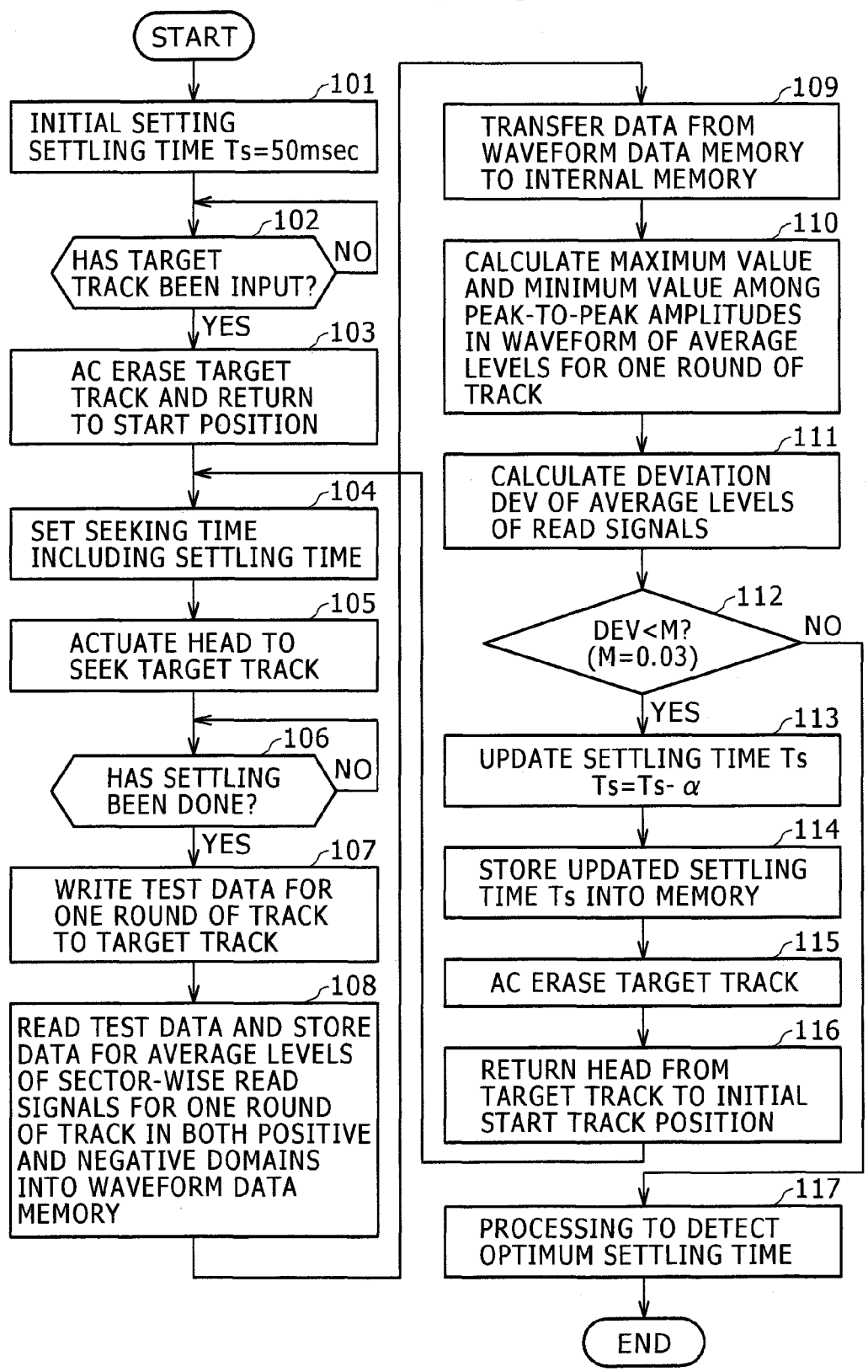
FIG. 3 is a basic flowchart of seeking time measurement processing.

Although the settling time is thus decremented by a constant value a in the subtraction step 113 in FIG. 3, flexible subtraction not based on the decrement by a constant value may be applied. Furthermore, this invention is not limited to using such subtractive processing and includes the possibility of using any manner in which a minimum seeking time equal to or less than the predetermined value can be obtained, which is obtained as the result of the judgment in the step 113.

Application of the invention is not limited to the start time of inspection of a magnetic disk or magnetic head. During such inspection, it is possible to obtain a minimum settling time by periodic interrupt processing or the like such that the processing in FIG. 3 is periodically performed. Further, it is possible to carry out inspection when, for example, parts of a head carriage system are changed.

In the embodiment described hereinbefore, the calculating equation DEV=(H−L)/(H+L) is used to calculate a deviation DEV of average levels. However, this may be replaced by a calculating equation DEV=(H−L)/H or DEV=(H−L)/L, wherein, the predetermined value as a judging criterion differs in each case. Obtaining KDEV or 1/KDEV (where K is a natural number other than "0") in each of these equations is included in the scope of calculation in each of the above-presented equation of this invention.

While determining a settling time Ts that is applied in the inspection of a magnetic disk has been described in the embodiment, the method of the invention may detect an optimum seeking time as a seeking time obtained by adding a time to be taken for positioning the head on a particular track to the settling time Ts and, obviously, this invention can also be applied to the inspection of a magnetic head.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed is:

1. In a seeking time measurement process in which, in order to inspect a magnetic head or a magnetic disk, the magnetic head is actuated to seek a track segmented into sectors on the magnetic disk, test data is written to the track and the test data is then read from the track, and a settling time until vibration of the magnetic head attenuates or a seeking time including the settling time is measured, a method for measuring an optimum seeking time taking the settling time of the magnetic head into account, the method comprising:

calculating the seeking time to be taken for a seek from a given track or a head load position to a target track, actuating the magnetic head to seek the target track in compliance with the seeking time, and writing the test data to the target track after the seeking time;

reading the written test data from the target track, detecting sector-wise average levels of the test data read levels in positive and negative domains respectively, and sampling a waveform of the average levels for one round of track; and detecting a maximum value H and a minimum value L among peak-to-peak amplitudes in the sampled waveform for one round of track, further calculating a deviation DEV of the average levels by an equation, DEV=(H−L)/(H+L), DEV=(H−L)/H, or DEV=(H−L)/L, where DEV is a deviation of the average levels, and judging whether the deviation DEV of the average levels is equal to or less than a predetermined value or exceeds the predetermined value;

wherein the predetermined value corresponds to the deviation DEV of the average levels calculated by the selected equation, when a seeking time is set including the settling time that is equal to or more than a maximum time of settling that the magnetic head is settled during the seek to the target track, and wherein the method further comprises calculating the seeking time while changing the settling time and, after writing and reading the test data, obtaining, as an optimum seeking time, a minimum value of seeking time equal to or less than the predetermined value obtained by the judgment or obtaining, as an optimum settling time, a value of settling time when the minimum value of seeking time is obtained.

2. The method for measuring an optimum seeking time taking the settling time of the magnetic head into account according to claim 1, wherein the test data is written to the target track after executing an AC erasing to the target track, and wherein said seeking time is calculated by recalculating an initial value of seeking time including the settling time that is equal to or more than a maximum time of settling that the magnetic head is settled during the seek to the target track by gradually decrementing the settling time included in the initial value, wherein the minimum value of seeking time is assumed to be a seeking time calculated based on the second last one of the values of settling time having measured upon detecting that the predetermined value has been executed by the judgment as to whether the deviation DEV is equal to or less than the predetermined value.

3. The method for measuring an optimum seeking time taking the settling time of the magnetic head into account according to claim 2, wherein the deviation DEV of the average levels is calculated by DEV=(H−L)/(H+L), the predetermined value is 0.03, and the initial value of the settling time is given to be equal to or more than a maximum value of settling time in any of the following seeks in which settling takes longest: a seek from the head load position to an outermost track on the magnetic disk, a seek from the head load position to an innermost track on the magnetic disk, a seek from the outermost track to the innermost track, and a seek from the innermost track to the outermost track, and wherein changing the settling time is performed by decrementing the initial value of settling time by a constant quantity after each of the judgment.

4. The method for measuring an optimum seeking time taking the settling time of the magnetic head into account according to claim 3, wherein the initial value of the setting time is given to be equal to or more than a maximum value of settling time when seeking at least three tracks; i.e., during a seek from the head load position to the outermost track of the magnetic head, a seek from the head load position to the innermost track of the magnetic head, and a seek from the head load position to a track located in a middle position between the outermost track and the innermost track.

5. The method for measuring an optimum seeking time taking the settling time of the magnetic head into account according to claim 4, wherein the predetermined value falling within a range of 0.02 to 0.03 is given and the judgment judges whether or not the deviation DEV falls within the range of 0.02 to 0.03.

6. An inspecting apparatus that inspects a magnetic head or a magnetic disk, according to an optimum seeking time detected by the method for measuring an optimum seeking time taking the settling time of the magnetic head into account according to claim 5.

7. An inspecting apparatus that inspects a magnetic head or a magnetic disk, according to an optimum seeking time detected by the method for measuring an optimum seeking time taking the settling time of the magnetic head into account according to claim 2.

8. An inspecting apparatus that inspects a magnetic head or a magnetic disk, according to an optimum seeking time detected by the method for measuring an optimum seeking time taking the settling time of the magnetic head into account according to claim 3.

9. An inspecting apparatus that inspects a magnetic head or a magnetic disk, according to an optimum seeking time detected by the method for measuring an optimum seeking time taking the settling time of the magnetic head into account according to claim 4.

10. An inspecting apparatus that inspects a magnetic head or a magnetic disk, according to an optimum seeking time detected by the method for measuring an optimum seeking time taking the settling time of the magnetic head into account according to claim 1.

* * * * *